June 29, 1965 G. E. KEEFER 3,192,302
POWER CONTROL FOR ELECTRIC GLASS MELTING FURNACE
Filed March 29, 1961 4 Sheets-Sheet 1
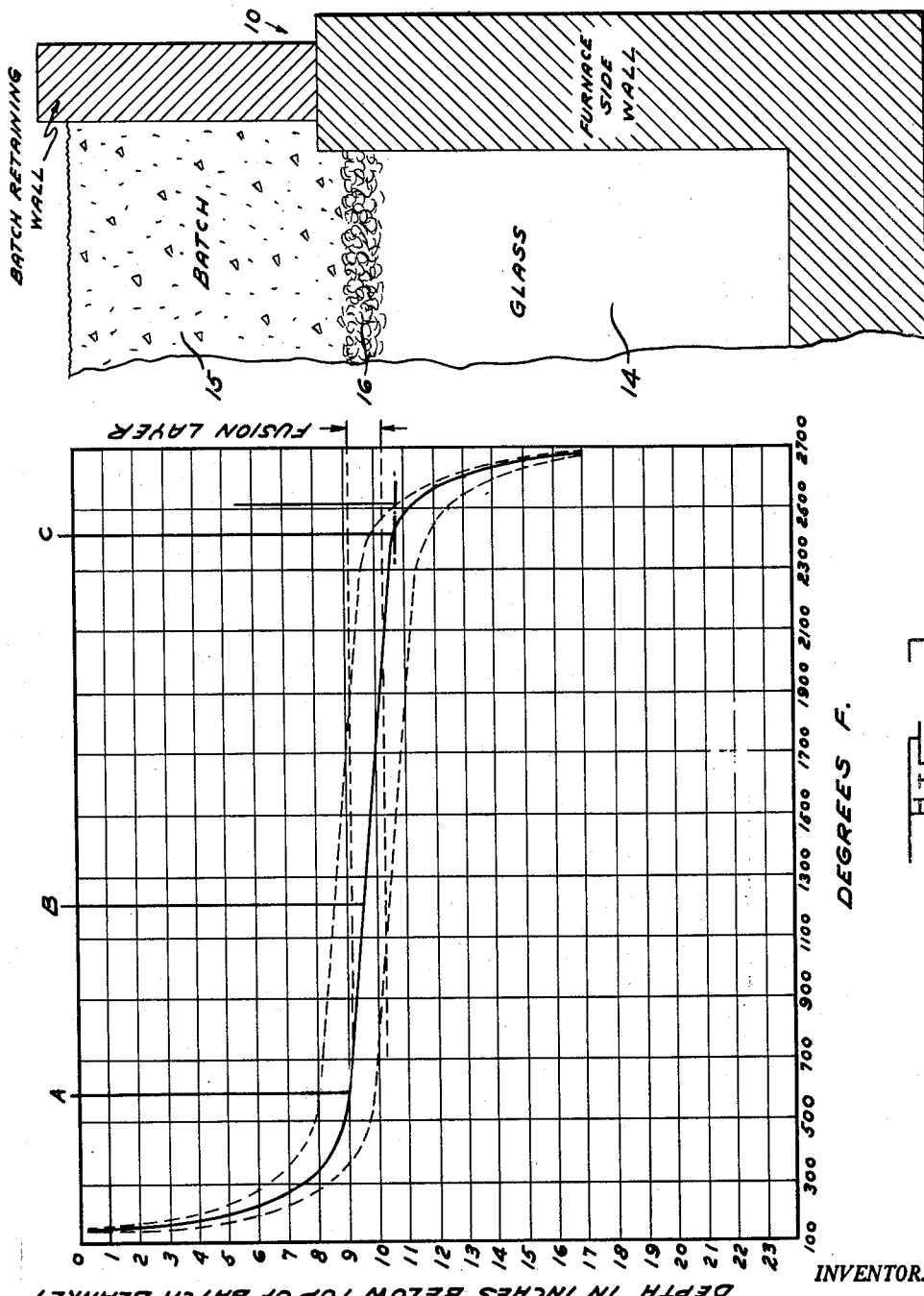
INVENTOR.
GEORGE E. KEEFER
BY
ATTORNEYS

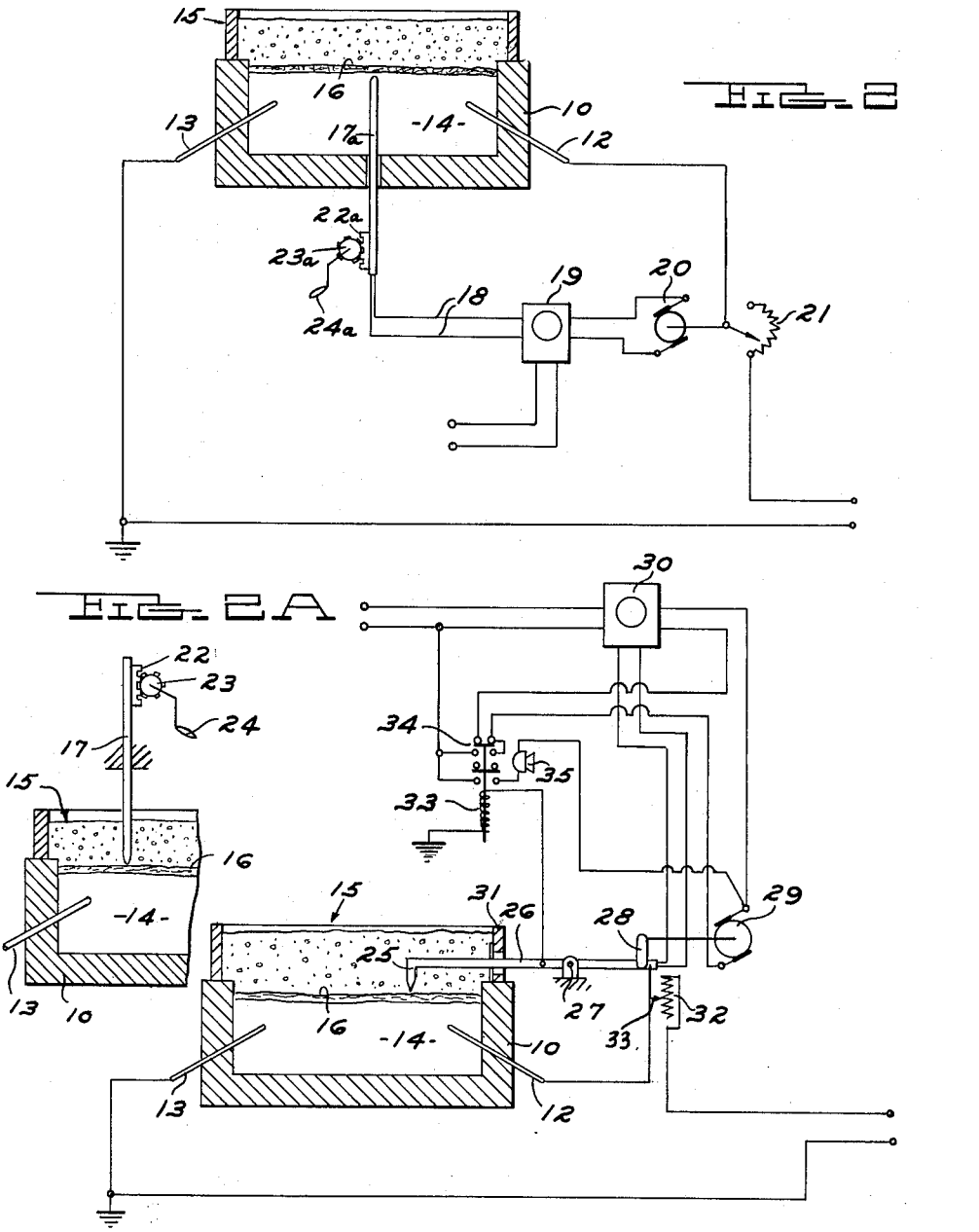

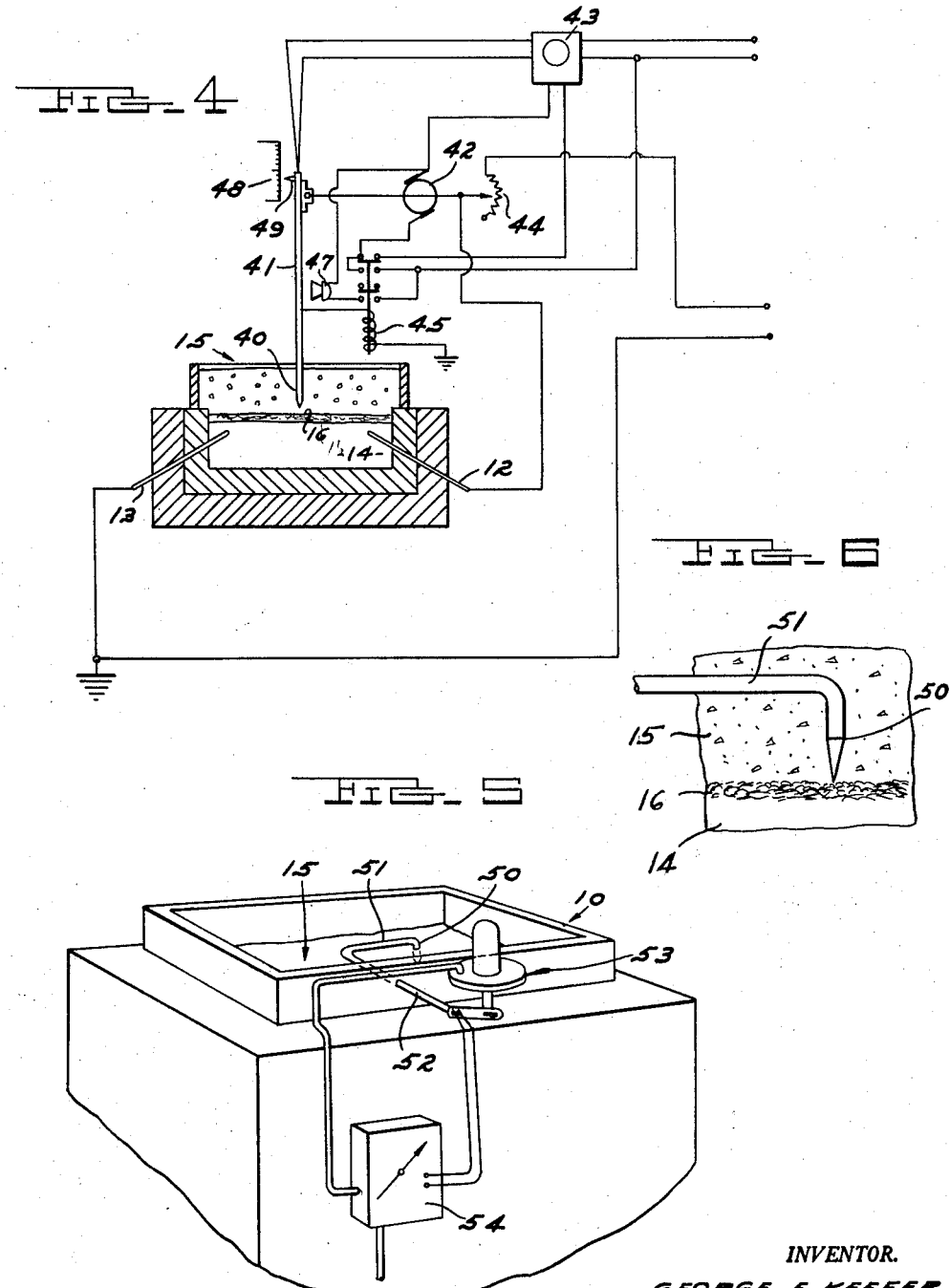

INVENTOR.
GEORGE E. KEEFER 3,192,302
POWER CONTROL FOR ELECTRIC GLASS
MELTING FURNACE
George E. Keefer, Sylvania, Ohio, assignor to Owens-Illinois Glass Company, a corporation of Ohio
Filed Mar. 29, 1961, Ser. No. 99,272
9 Claims. (Cl. 13—6)

The purpose of this invention is to provide a method of automatically controlling the batch blanket thickness and the power input to a top fed electric glass melting furnace.

In an electric glass melting furnace, power is applied to the furnace through electrodes extending into the molten glass. The power may be single or multiple phase and must be varied to accommodate changes in the rate at which the glass is melted and changes in the heat losses from the furnace. Batch materials are fed to the top of the furnace manually or mechanically at a rate which will maintain a desired glass level in the working end of the furnace. Charging of batch materials to the top of the furnace may be accomplished automatically by use of a glass level control mechanism that will cause batch materials to be fed at a rate sufficient to maintain a constant glass level at the working end, shown and described in my U.S. Patent 2,910,196. The batch materials cover the upper surface of the molten glass in the furnace in a batch blanket.

It is desirable to control the rate of application of electrical energy input so that the rate of melting of glass of equal to the rate of glass withdrawn. Under this condition, and with batch being applied at a rate to compensate for glass withdrawal, the thickness of the batch blanket will remain constant. If the power input is higher than it should be, glass is melted faster than it is withdrawn and the batch blanket becomes thin. If less power than required is applied, glass is not melted as fast as it is withdrawn and the batch blanket becomes thick.

If the thickness of the batch blanket varies, the quantity of volatile materials held within the batch blanket varies causing a variation in the color and other properties of the glass. In addition, if the batch blanket gets too thick, gases trapped below the batch blanket erupt causing glass and partially fused batch to be discharged to the top surface of the batch blanket. If the batch blanket gets too thin the heat loss through the batch blanket becomes excessive.

Prior to this invention, the power input to top fed electric melting furnaces has been controlled manually by adjusting the voltage and amperage depending upon one or a combination of several factors—(1) temperature of the main glass body; (2) resistance or conductance of the glass; (3) thickness of the batch blanket measured manually; and (4) load on the furnace.

With manual control periodic measurements and adjustments are required and variations in batch blanket thickness are encountered, especially if there are any changes in load. In manual control the thickness of the batch blanket is determined by a manual probe. If the batch blanket is found to be thicker than desired, the power is increased by manual manipulation of the power input controls which may be in any one of a number of forms, such as a variable reactor, induction regulator, tap changing transformer, motor generator set, or others.

It is therefore an object of this invention to provide a method and apparatus for accurately controlling the batch blanket thickness and the power input in a top fed electric glass melting furnace.

It is a further object of the invention to provide such a method and apparatus which will result in a more uniform quality of glass being melted.

Basically, the invention comprises determining the temperature at the interface between the batch blanket and molten glass and controlling the power to the electrodes of the furnace in response to a deviation of the position of the interface as indicated by the temperature measured by the thermocouple.

In the drawings:

FIG. 1 is a combined view of a fragmentary sectional view of an electric glass melting furnace and a curve of depth below the top of the batch blanket vs. temperature of said furnace.

FIG. 2 is a part sectional, partly diagrammatic view of an apparatus embodying the invention.

FIG. 2a is a fragmentary, part sectional view of a modified form of apparatus.

FIG. 3 is a part sectional, partly diagrammatic view of a further modified form of the apparatus.

FIG. 4 is a part sectional, partly diagrammatic view of a further modified form of the apparatus.

FIG. 5 is a fragmentary, partly diagrammatic perspective view of a further modified form of the apparatus.

FIG. 6 is a fragmentary view on an enlarged scale of a portion of the apparatus shown in FIG. 5.

Figure 7:
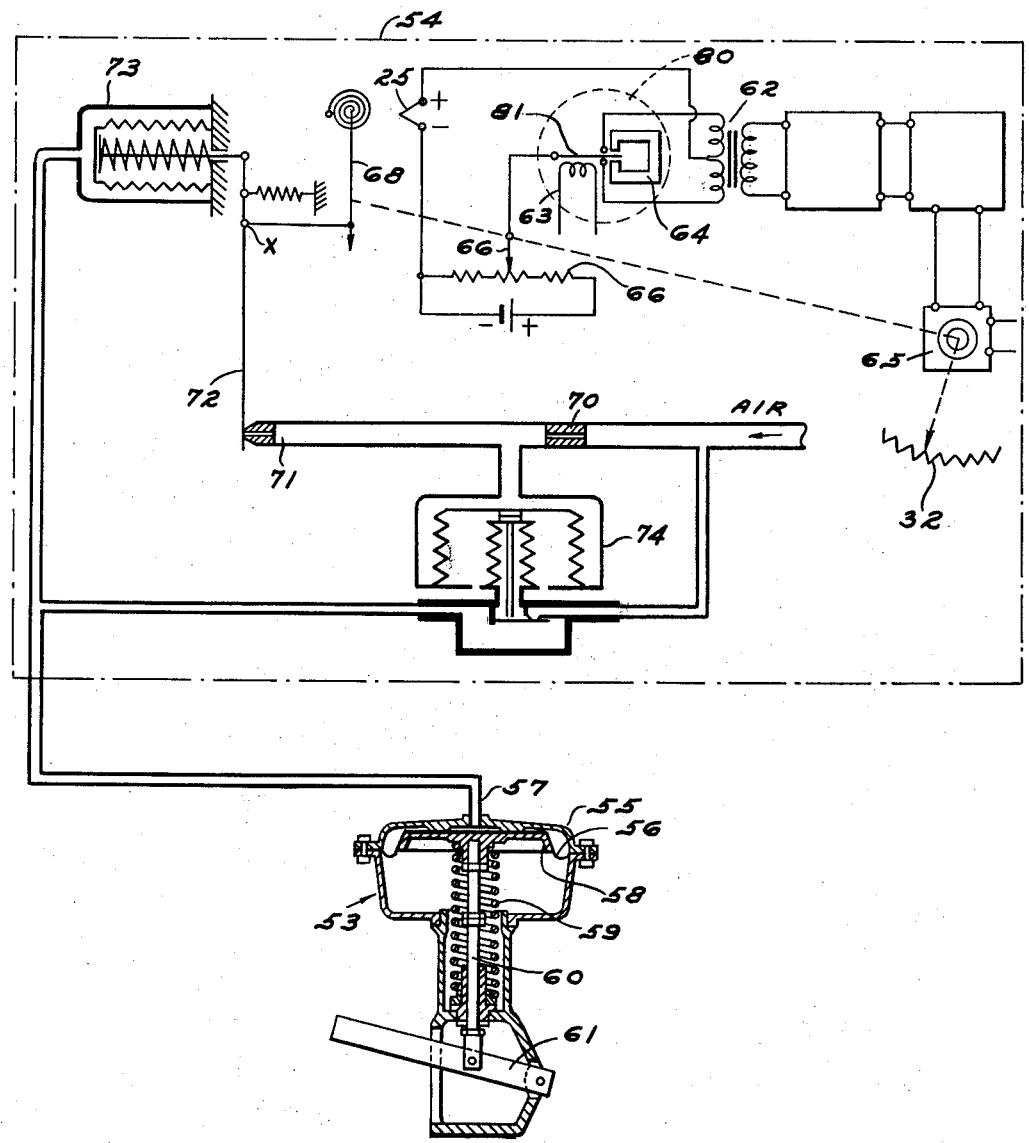
FIG. 7 is a part sectional, partly diagrammatic view of a portion of the apparatus shown in FIG. 5.

Referring to FIG. 2, the invention is intended for use with electric glass melting furnaces which comprise a tank 10 to which glass batch materials are provided. The glass batch materials are melted by the application of power to electrodes 12, 13 which project into the tank 10. When the furnace is in operation, a body 14 of molten glass is provided in the tank with an overlying blanket 15 of batch materials. Such furnaces in the apparatus for charging them are shown in the patents to George E. Keefer 2,910,194, 2,910,196 and Ralph H. Olson 2,910,195, issued October 27, 1959.

As shown in FIG. 1, which includes a solid line curve of depth below the top of the batch blanket vs. temperature, in such furnaces, the top surface of the batch blanket 15 is at or near room temperature. The temperature increases progressively downwardly through the batch blanket 15 and rises sharply at the melting surface or interface 16 between the body of molten glass 14 and batch blanket 15. Below the batch blanket, the temperature in the glass rises from a low just below the batch blanket to a normal high temperature within the body 14 of glass.

According to the invention, a thermocouple is utilized to determine the thickness of the glass batch. Referring to FIG. 1, a thermocouple is brought, as shown at A, into contact with the normal top surface of the fusion layer 16. As the batch blanket becomes thicker, the fusion layer 16 shifts to a lower position resulting in a lessening in the temperature indicated by the thermocouple at A. If the batch blanket becomes thinner, the fusion layer 16 moves upwardly causing the thermocouple at A to register a temperature higher than normal.

The thermocouple can also be positioned at the mid point of the normal fusion layer 16 as shown at B in FIG. 1. When the batch blanket becomes thinner, the temperature measured by the thermocouple at B would be considerably higher than the normal temperature. If the batch blanket becomes thicker, the temperature indicated by the thermocouple at B would be considerably lower than the normal temperature.

The thermocouple can also be located at the lower or bottom edge of the fusion layer as shown at C. If the batch blanket becomes thinner, the temperature indicated by the thermocouple at C would be higher than normal.

If the batch blanket becomes thicker, the temperature indicated by the thermocouple at C would be lower than normal.

When the thermocouple at any of the points A, B or C indicates a temperature such that a thinner batch blanket is indicated, less power is applied to the melting electrodes 12, 13 to decrease the melting action and restore the batch blanket to its normal thickness. If the temperature indicated by the thermocouple at points A, B or C indicates that the batch blanket thickness is thicker than desired, more power is provided to the furnace electrodes 13 to increase the melting action and restore the batch blanket to its normal thickness.

In practice, in order to permit the greatest sensitivity and the use of thermocouples of less expensive materials, it is found preferable to locate the thermocouple as at A and, in addition, move the thermocouple in response to the variation in temperature so that it is always adjacent the top surface of the fusion layer 16. This prevents damage to the thermocouple by deposition of fused batch thereon, which would cause erratic temperature indications and resultant erratic application of power to the electrodes.

An apparatus for positioning the electrodes as at position A or B in FIG. 1 is shown in FIG. 2a wherein a thermocouple 17 is projected downwardly through the batch 15 so that its tip is at a predetermined level with respect to the fusion layer 16. In order to control the setting of the thermocouple 17, suitable means are provided as, for example, a rack 22 and pinion 23 which matches with rack 22 and is operated by a handle 24. The tip of the thermocouple is positioned either adjacent the top surface of the normal position of the fusion layer 16, as represented by position A in FIG. 1, or in the fusion layer 16, as represented by position B in FIG. 1.

An apparatus for positioning the electrodes as at position C in FIG. 1 is shown in FIG. 2 wherein a thermocouple 17a is projected upwardly through the bottom wall of the tank 10 so that its tip is at a predetermined level at which the depth of the glass body 14 and thickness of the blanket 15 are desired. Leads 18 from thermocouple 17a extend to a temperature recording controller 19 which is adapted to control a reversible electric motor 20 which, in turn, varies the pick-up on a rheostat 21 which controls the power to the electrodes 12, 13.

If the batch blanket 15 becomes thicker as when glass is pulled at a faster rate from the furnace 10 than the rate at which the glass is being melted, the cooler surface 16 approaches the thermocouple 17a causing the temperature of the thermocouple to drop. The controller 19 responds by driving the motor 20 in a direction to increase the power input to electrodes 12, 13. When the batch blanket becomes thinner, as when glass is being pulled at a lesser rate than it is being melted in the furnace 10, the controller 19 operates the motor 20 in the opposite direction to change the rheostat 21 and thereby decrease the power applied to the electrodes 12, 13. In this fashion, the apparatus functions to maintain the batch blanket at a uniform thickness. Instead of operating a rheostat, motor 20 could be used to control other means of varying the power to the electrodes 12, 13 such as a variable reactor, induction regulator, tap changing transformer or the like.

In order to control the setting of the thermocouple 17, suitable means may be provided as, for example, a rack 22a and pinion 23a which meshes with rack 22a and is operated by a handle 24a.

The apparatus for controlling the power shown in FIG. 2, namely, controller 19, reversible motor 20 and rheostat 21, can also be used in connection with the apparatus shown in FIG. 2a to achieve control of the power to the electrodes. The arrangement is substantially the same as in FIG. 2 in that the controller 19 is connected so that an increase in temperature on the thermocouple 17 indicating that the batch blanket has become thinner causes the motor 20 to be operated to reduce the power applied by rheostat 21 to the electrodes 12, 13. If the batch blanket becomes thicker, as indicated by a drop in temperature on the thermocouple 17, the controller 19 operates the motor 20 to increase the power supplied by rheostat 21 to the electrodes 12, 13.

A modified form of the invention is shown in FIG. 3 wherein thermocouple 25 is positioned directly by the control drive of the rheostat. Such an arrangement permits the use of a cheaper and more sensitive thermocouple since there is no danger that the thermocouple will come into contact with the hot molten glass. As shown in FIG. 3, thermocouple 25 is mounted on a lever 26 that is pivoted at 27 intermediate its ends and is operatively connected by a link 28 to a reversible electric motor 29. Motor 29 is operated by a temperature recording controller 30 which is, in turn, responsive to the temperature recorded by the thermocouple 25. As shown, the thermocouple 25 is positioned in the batch blanket 15 by projecting through a batch retaining wall 31 of the furnace 10.

If the batch blanket becomes thicker, as when glass is pulled from the furnace at a faster rate than it is being melted, the batch melting surface 16 moves away from the thermocouple 25 causing the temperature sensed by the thermocouple 25 to drop. This, in turn, is registered in the temperature recording controller 30 which operates the electric motor 29 moving the tap 33 on rheostat 32 and thereby increase the power input to the electrodes 12, 13. Simultaneously with the changing and the setting of the rheostat 32, the lever 26 is swung to move the thermocouple 25 downwardly, thereby indicating the position of the batch melting surface 16. As the thermocouple 25 approaches the surface 16, the temperature thereof rises and is registered in the temperature recording controller which operates to stop the motor 29. If the thickness of the batch blanket lessens because glass is being pulled at a lesser rate than it is being melted, the increased temperature on the thermocouple 25 is registered on the temperature recording controller 30 causing the motor 29 to operate in the opposite direction to change the setting of the rheostat 32 and decrease the power applied to the electrodes 12, 13. Simultaneously, the lever 26 and, in turn, the thermocouple 25 are moved away from the batch melting surface 16 until the temperature sensed by the thermocouple 25 decreases to such a level that the temperature recording controller 30 stops the motor 29.

In the apparatus shown in FIG. 3, a safety device and alarm are provided in the event that due to some malfunction, the thermocouple 25 touches the molten glass. In such a case, contact of the thermocouple 25 with the glass body 14 completes a circuit to ground, energizing a solenoid 33 and closing a relay 34 which operates an electric horn 35 and, at the same time, completes a circuit to motor 29. Motor 29 rotates to swing the lever 26 and move the thermocouple 25 upwardly. When the thermocouple 25 moves out of contact with the glass, the circuit to the coil 33 is opened, opening relay 34, de-energizing horn 35 and stopping the motor 29.

A further modified form of the invention is shown in FIG. 4 wherein the thermocouple 40 is mounted on a bar 41 which is movable vertically when the reversible electric motor 42 is operated in response to a temperature variation recorded by controller 43. The motor 42 operates a rheostat 44 and varies the power to the electrodes 12, 13 in the same manner as the form of the invention shown in FIG. 3. A safety device and alarm including a coil 45, relay 46, horn 47 are provided, as with the form of the invention shown in FIG. 3. In addition, a scale 48 is provided in association with a pointer 49 on bar 41 so that there is a direct reading of the thickness of the batch blanket.

A further modified form of the invention is shown in FIG. 5 and comprises a preferred form wherein the thermocouple 50 is provided on an L-shaped lever 51 which is mounted for pivotal movement in the wall of the furnace with long arm 52 extending horizontally so that the short arm thereof can swing about the axis of the long arm 52. Lever 51 is, in turn, adapted to be operated by a diaphragm type air motor 53 that is controlled by a temperature responsive controller 54. Controller 54 is adapted to operate a rheostat (not shown) as in the previous form of the invention.

Diaphragm type motor 53 and temperature recording controller 54 are of the general type shown in FIG. 7.

Air motor 53 is preferably of the diaphragm type of which there are various forms commercially available such as that manufactured by Minneapolis-Honeywell Regulator Company under the trademark "Air-O-Motor." Referring to FIG. 7, such motors comprise a sectional housing 55 which supports a flexible diaphragm 56. Air supplied to the upper surface of the diaphragm through inlet 57 acts to force plate 58 downwardly against the action of spring 59. A stem 60 is fixed to the plate 58 and is simultaneously moved downwardly. The lower end of the stem 60 is pivoted to a lever 61 that, in turn, is connected to the item which is to be operated, in this case, the arm on which the thermocouple is mounted.

Controller 54 operates to control the pressure of air supplied to the motor 53 until an equilibrium condition is established in the motor 53. Controller can be of various commercially available types such as that manufactured by Minneapolis-Honeywell Regulator Company under the trademark "Electronik." Referring to FIG. 7, which is a diagrammatic drawing of such an electronic controller, the unbalance between the D.-C. millivoltage developed by the thermocouple 50 and that from a standard voltage source, is changed to an A.-C. voltage of proportional magnitude in a converter-transformer. The converter 80 is essentially a flat metal reed 81 oscillating between two contacts connected to the opposite ends of the primary winding on an input transformer 62. The unbalanced D.-C. voltage is impressed across the converter and the center tap of the primary winding on the input transformer. As the reed moves from one contact to the other, any unbalanced D.-C. voltage will cause direct current to flow first in one direction through one-half the primary winding, then in the opposite direction through the other half. This action generates an alternating flux in the input transformer core, which in turn induces an alternating voltage in the transformer secondary.

The action of the converter is related to the A.-C. supply voltage by the energizing coil 63 which is excited by the A.-C. supply voltage through a step-down transformer. Reed 81 is polarized by a permanent magnet 64 and, therefore, is actuated by the energizing coil 63 to oscillate in synchronism with the A.-C. supply voltage. Reed 81 closes one contact to the transformer 62 for one-half the supply voltage cycle and the other contact for the other half, making one complete oscillation for each cycle. The direct current flowing in each half of the transformer primary winding, therefore, creates an alternating current in the transformer secondary of the same frequency as the supply current. This alternating current is amplified so that it will actuate a two-field balancing motor 65.

If there is an unbalance between the voltage of slide wire 66 as set into the controller and the voltage generated by the thermocouple the balancing motor 65 functions to rebalance the two voltages by moving the instrument pen or pointer 68 to a new temperature value. The direction in which the motor rotates is determined by a definite phase relationship between the A.-C. supply voltage and the amplified A.-C. thermocouple voltage. This relationship depends, of course, upon whether the measured variable is higher or lower than the value indicated by the instrument. When no unbalance exists, there is no movement of the instrument pen or pointer.

The controller also incorporates a flapper and nozzle system which controls the application of air to the motor 53. In one type of Honeywell non-indicating pneumatic controller, the flapper and nozzle principle is used to provide narrow band proportional control by the use of a restriction fitting 70 in the external air connection to the controller. Air supply passes through the restriction, branching out respectively to (1) the nozzle 71 and flapper 72 in the controller and (2) to the diaphragm motor valve 74.

A small pen movement, such that the flapper 72 moves toward the nozzle 71, causes an increase in the output pressure from the pilot relay 73. This increased pressure operates through the throttling bellows to move the flapper about its fulcrum (X) in a direction opposite from its first motion and to stabilize the output pressure at a slightly increased value. Manual adjustment of the proportional band causes a vertical shift of the flapper fulcrum point (X).

In a direct-acting controller, the unit responds as follows: On a decrease in the controlled variable, the pen 68 moves the flapper 72 away from the nozzle 71, thereby decreasing the nozzle pressure and the air-to-valve pressure. Pressure decrease on the throttling bellows 73 causes it to move the flapper 72 back toward the nozzle 71 again by an amount depending upon the proportional band setting. The net movement of the flapper 72 and the consequent change in air pressure decrease as the band setting is made wider. With an extremely wide band of 150 percent, for example, a one percent pen movement would position the flapper within $\frac{1}{150} \times 0.006$ inch or around $\frac{4}{1,000,000}$ of an inch.

The apparatus described in connection with FIG. 7 is preferred, but it, of course, may be understood that other apparatus may be substituted with substantially similar results.

It can thus be seen that I have provided a method and apparatus for quickly and easily measuring and controlling the batch blanket thickness and the power input to a top fed electric glass melting furnace.

I claim:

1. In the melting of glass by feeding batch materials to a furnace, simultaneously applying electrical power to electrodes within the glass and removing molten glass from the furnace, thereby creating a batch blanket and a fusion layer at the interface between the batch blanket and the body of molten glass, there being a substantial temperature change at said interface, the method of controlling the position of the fusion layer which comprises positioning a temperature responsive element at the interface between the batch blanket and the body of molten glass, comparing the temperature sensed by said element with the temperature which said element should sense when the batch blanket is of the desired thickness so that the position of the interface is at a predetermined point, creating a signal when said temperatures differ, and causing said signal to vary the power to the electrodes.

2. The method set forth in claim 1 wherein said temperature responsive element is positioned at the junction of the fusion layer and the glass body and wherein said power is varied in response to said signal by increasing the power when the temperature of said element decreases below the temperature said element should sense and decreasing the power to said electrodes when the temperature of said element increases above the temperature said element should sense.

3. The method set forth in claim 1 wherein said temperature responsive element is positioned at the junction of the batch blanket and the fusion layer and wherein said power is varied to the electrodes by increasing the power to the electrodes when the temperature of said element decreases below the temperature said element should sense and decreasing the power to said electrodes when the temperature of said element increases above the temperature said element should sense.

4. The method set forth in claim 1 wherein said temperature responsive element is positioned in the fusion layer and wherein the power is varied to said electrodes in response to said signal by increasing the power to said electrodes when the temperature of said element decreases below the temperature said element should sense and decreasing the power to said electrodes when the temperature of said element increases above the temperature said element should sense.

5. In the melting of glass by feeding batch materials to a furnace, simultaneously applying electrical power to electrodes within the glass and removing molten glass from the furnace, thereby creating a batch blanket and a fusion layer at the interface between the batch blanket and the body of molten glass, there being a substantial temperature change at said interface, the position of said interface occurring at a predetermined point when said batch blanket is of desired thickness, said position of said interface being subject to variation, the method of controlling the position of the fusion layer which comprises moving a temperature responsive element toward said interface when said interface is at said predetermined point until the said substantial temperature change is indicated by said element, causing said element to continuously follow the varying level of the interface, creating a signal when the position of said point of said temperature change differs from the position of said point of temperature change sensed by said element when said element was moved toward said interface, and causing said signal to vary the power to the electrodes in response to said signal.

6. The method set forth in claim 5 including the step of increasing the power to said electrodes when the position of said point of temperature change is lower than the position of said point of temperature change when said element was moved toward said interface and decreasing the power to said electrodes when the position of said point of temperature change is higher than the position of said point of temperature change when said element was moved toward said interface.

7. The method set forth in claim 5 wherein said temperature responsive element is caused to continuously follow the varying level of the interface at the junction of the fusion layer and the glass body.

8. The method set forth in claim 5 wherein said temperature responsive element is caused to continuously follow the varying level of the interface at the junction of the batch blanket and the fusion layer.

9. The method set forth in claim 5 wherein said temperature responsive element is caused to continuously follow the varying level of the interface in the fusion layer.

References Cited by the Examiner

UNITED STATES PATENTS

| | | | |
|---|---|---|---|
| 1,338,881 | 5/20 | Stock | 13—33 |
| 1,535,883 | 4/25 | Winne | 314—74 |
| 2,002,692 | 5/35 | Dahl | 219—491 |
| 2,032,016 | 2/36 | Hitner | 318—18 |
| 2,262,070 | 11/41 | Turk | 65—135 |
| 2,280,101 | 4/42 | Slayter et al. | 13—6 |
| 2,314,956 | 3/43 | Slayter et al. | 13—6 |
| 2,417,913 | 3/47 | Cornelius | 13—6 |
| 2,483,333 | 9/49 | Cannon et al. | 33—126 |
| 2,559,683 | 7/51 | Skinner et al. | 13—6 |
| 2,613,443 | 10/52 | Helmick | 33—126 |
| 2,645,749 | 7/53 | Labino et al. | 318—102 |
| 2,679,749 | 6/54 | Poole | 73—54 |
| 2,737,807 | 3/56 | Brichard | 73—290 |
| 3,047,647 | 7/62 | Harkins et al. | 13—6 |

RICHARD M. WOOD, *Primary Examiner.*

DAVID H. SYLVESTER, JOSEPH V. TRUHE,
*Examiners.*